Dec. 19, 1950  H. G. DULLI  2,534,759
CUTTING TOOL
Filed April 8, 1947  2 Sheets-Sheet 1

Inventor
Hermann George Dulli

By *Clarence A. O'Brien and Harvey B. Jacobson*
Attorneys

Dec. 19, 1950     H. G. DULLI     2,534,759
CUTTING TOOL
Filed April 8, 1947     2 Sheets-Sheet 2
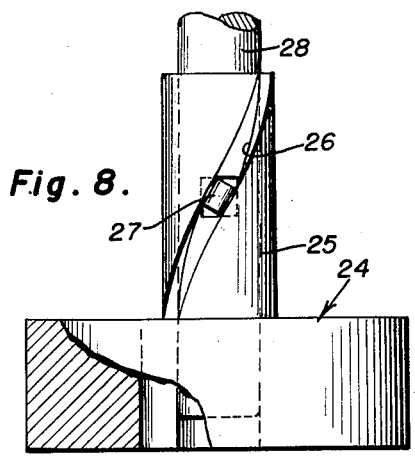
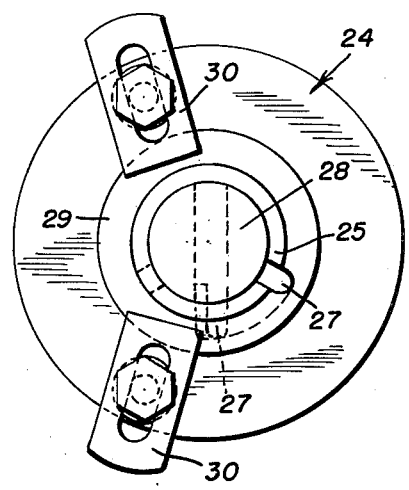
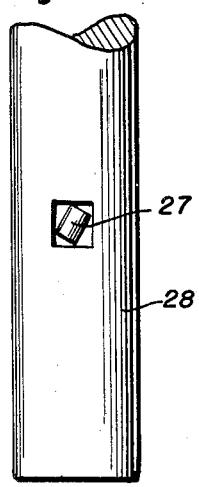
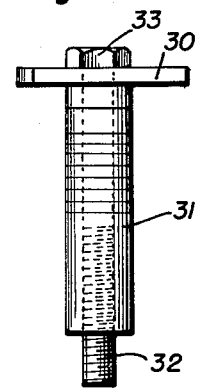
Inventor
Hermann George Dulli
By *Clarence A. O'Brien and Harvey B. Jacobson*
Attorneys Patented Dec. 19, 1950

2,534,759

UNITED STATES PATENT OFFICE 2,534,759

CUTTING TOOL

Hermann George Dulli, Hamilton, Ohio

Application April 8, 1947, Serial No. 740,187

3 Claims. (Cl. 90—43)

The present invention relates to new and useful improvements in tools for cutting oil grooves or internal keyways in bearings, gears and similar devices.

An important object of the present invention is to provide an internal cutter of this character arranged to cut an internal oil groove or keyway in the work without defacing the finish of the bore of the work in which the groove is cut.

A still further object of the invention is to provide a cutting tool of this character embodying means for cutting either a longitudinal internal groove in the work or for cutting a spiral groove therein.

A still further object is to provide a tool of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 8 is a side elevational view of a spiral groove cutting tool;

Figure 9 is a top plan view showing a bushing clamped in position on the tool;

Figure 10 is an enlarged fragmentary elevational view showing the angle of the cutter for cutting the spiral groove, and Figure 11 is a side elevational view of the built-up pedestal for the clamp.

Figure 3:
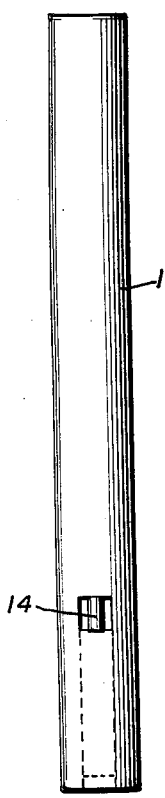
Figure 3 is a view in elevation of the tool holder.

Referring now to the drawings in detail, and first with respect to the form of the invention illustrated in Figures 1 to 7, inclusive, the numeral 5 designates a work support which includes a circular base 6 having a sleeve 7 rising therefrom in alignment with a bore 8 extending vertically through the base. The sleeve is formed at one side with a vertical slot 9.

A cylindrical cutter bar 10 has its lower end slidably mounted in the sleeve 7 and bore 8, the cutter bar having a transverse opening 11 adjacent its lower end in which a cutter 12 is adjustably clamped by means of a set screw 13 threaded upwardly through the lower end of the cutter bar to clamp the cutter in the opening 11 with the cutting edge 14 of the cutter projecting laterally from one side of the cutter bar and outwardly through the slot 9.

An eccentric bushing 15 is positioned over the sleeve 7 and secured thereto by a set screw 16, the bushing at its narrow edge having a longitudinally extending slot 17 registering with the slot 9 of the sleeve and to which the cutter 12 also projects for cutting a longitudinal internal groove 18 in a bushing or other work 19 sleeved over the eccentric bushing 15.

In the operation of the device the work support 5 is mounted on a table 20 of a press 21 of conventional construction which operates to push the cutter bar 10 through the sleeve and work.

Figure 2:
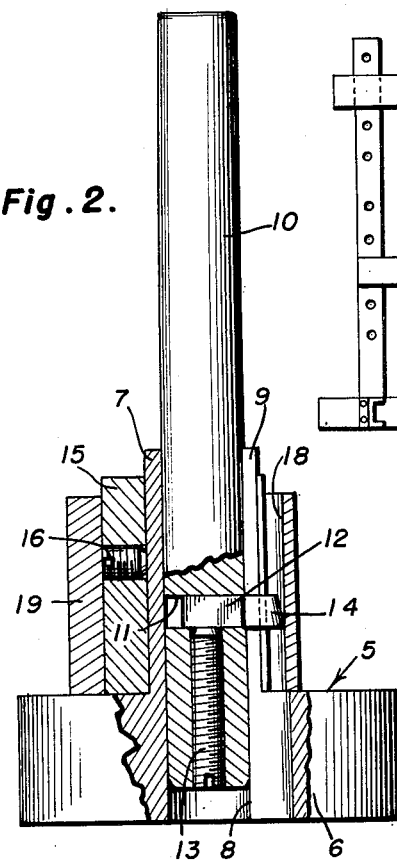
Figure 2 is an enlarged side elevational view of the tool removed from the press and with parts shown in section.
Figure 1:
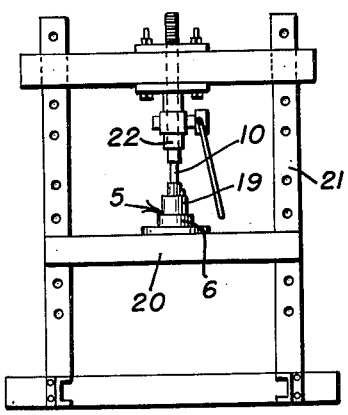
Figure 1 is a side elevational view of a press for operating the cutter.
Figure 5:
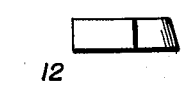
Figure 5 is a side elevational view of the cutter.
Figure 6:
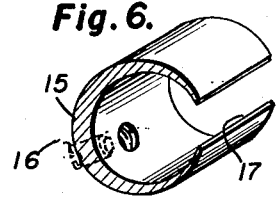
Figures 6 and 7 are perspective views of the eccentrics or bushings of various sizes.
Figure 4:
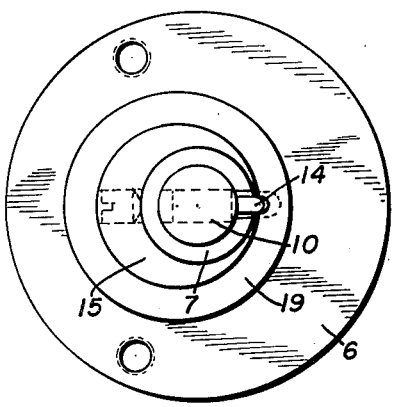
Figure 4 is a top plan view of the assembled tool.

The eccentric bushing of proper diameter is secured in position on the sleeve 7 by the set screw 16 and the bushing or other work 19 sleeved over the eccentric bushing 15 as shown in Figure 2 of the drawings. The downward movement of the cutter bar 10 and cutter 12 will operate to cut the vertical internal groove 18 in the bushing 19.

Figure 7:
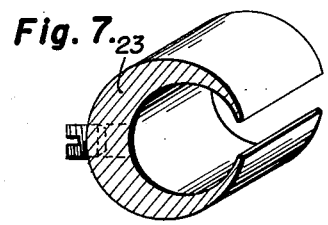

Figure 7 illustrates an eccentric bushing 23 of increased diameter which is interchangeably mounted on the sleeve 7 for bushings of a larger size.

In Figures 8 to 11 inclusive the work support 24 is shown with the sleeve 25 formed with a spiral groove 26 in which the cutter 27 carried by the cutter bar 28 is guided to cut a spiral groove in the bushing or other work 29.

In order to prevent the rotation of the work during the spiral cutting action one or more clamping plates 30 are moved into clamping engagement with the upper edge of the work, the clamping plate being positioned at the upper end of a built-up pedestal 31 secured at its lower end to the base of the work support 24 by a stud 32 and the clamping plate 30 is secured to the upper end of the pedestal by a bolt 33.

In view of the foregoing description taken in conjunction with the accompanying drawings it is believed that a clear understanding of the device will be quite apparent to those skilled in this art. A more detailed description is accordingly deemed unnecessary.

What I claim is:

1. An internal groove cutting tool comprising a work support including an upstanding tubular member having a slot therein, an eccentric adaptor sleeved on the tubular member and on which work is supported in an upright position, said adaptor also having a slot registering with the first named slot, and a cutter mounted to travel in said slots.

2. An internal groove cutting tool comprising a work support including an upstanding tubular member having a slot therein, an eccentric tubular adaptor sleeved on the tubular member and on which work is supported in an upright position, said adaptor also having a slot registering with the first named slot, and a cutter mounted to travel in said slots.

3. An internal groove cutting tool comprising a work support including a base having a tubular member rising therefrom, an adaptor sleeved on said tubular member and on which work is supported in an upright position, said tubular member and said adaptor having aligned slots, a cutter bar slidably mounted in the tubular member, and a laterally projecting cutter carried by the cutter bar to travel in said slots.

HERMANN GEORGE DULLI.

REFERENCES CITED

The following references are of record in the file of this patent:

UNITED STATES PATENTS

| Number | Name | Date |
| --- | --- | --- |
| 685,772 | LaPointe | Nov. 5, 1901 |
| 823,833 | Webb | June 19, 1906 |
| 1,339,656 | LaPointe | May 11, 1920 |
| 2,393,646 | Markstrum | Jan. 29, 1946 |

FOREIGN PATENTS

| Number | Country | Date |
| --- | --- | --- |
| 248,549 | Germany | Oct. 19, 1910 |